(Model.)
A. S. F. McBRIDE & H. D. HAISTEN.
VEHICLE GEAR.
No. 246,006.            Patented Aug. 23, 1881.
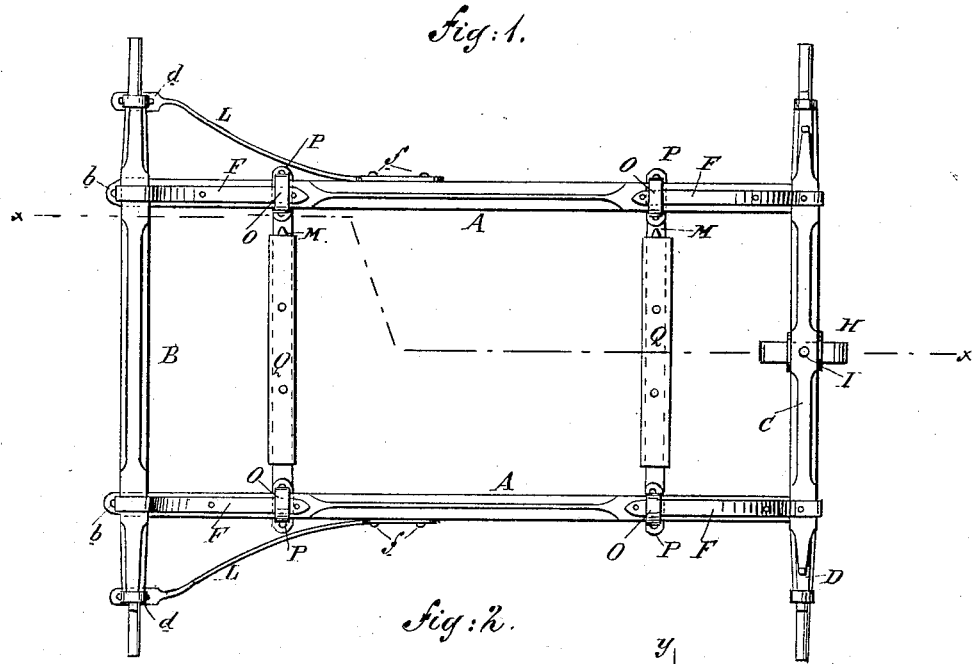
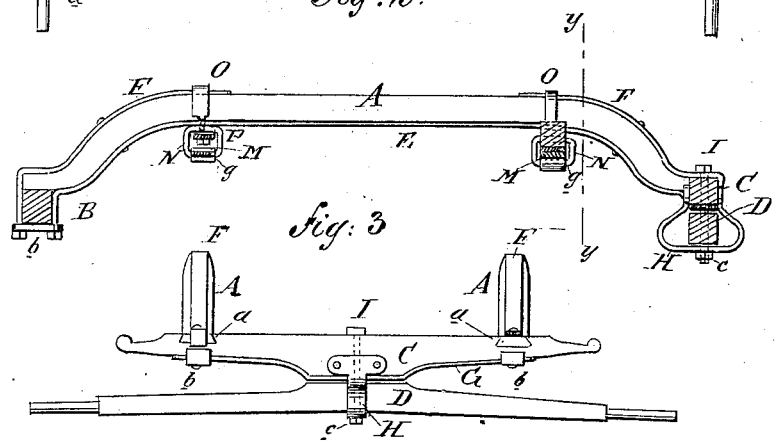
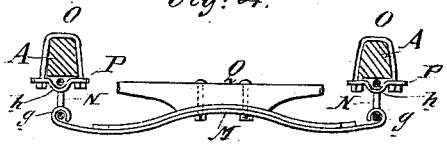
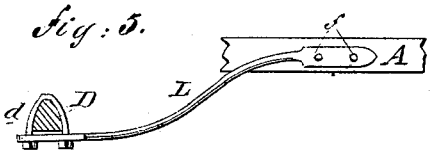
WITNESSES:           INVENTOR:
N. PETERS, Photo-Lithographer, Washington, D. C.

UNITED STATES PATENT OFFICE.

ADAM S. F. McBRIDE AND HENRY D. HAISTEN, OF CUTHBERT, GEORGIA.

VEHICLE-GEAR.

SPECIFICATION forming part of Letters Patent No. 246,006, dated August 23, 1881.

Application filed November 26, 1880. (Model.)

*To all whom it may concern:*

Be it known that we, ADAM S. F. MCBRIDE and HENRY D. HAISTEN, of Cuthbert, in the county of Randolph and State of Georgia, have invented a new and Improved Vehicle-Gearing, of which the following is a specification.

The object of this invention is to provide a gearing adapted to all carriages, and of superior elasticity, strength, and durability.

Figure 1 is a plan of the gearing. Fig. 2 is a sectional side elevation on line $x$ $x$, Fig. 1. Fig. 3 is a front-end elevation. Fig. 4 is a sectional end elevation on line $y\,y$, Fig. 2. Fig. 5 is a partly-sectional side elevation, showing the position of a rear-axle brace.

Similar letters of reference indicate corresponding parts.

In the drawings, A A represent the arched side bars, whose rear ends are mortised into the rear axle, B, and whose front ends are mortised into the bolster C, as shown at $a$. The side bars, A A, are further secured at their ends by metal straps E E, that are fastened on the under sides of said bars A A throughout their length, and have their ends bent upward on the said axle B and bolster C, while shorter straps F F, on the upper faces of the side bars, A A, also extend over the axle B and bolster C. The straps F and E have their ends secured upon and about the axle B and bolster C by suitable bolts or other convenient fastenings, as indicated at $b$, whereby the union between the side bars, A A, and the rear axle and bolster, B C, is made rigid and strong, while the straps E F also add materially to the strength of the side bars, A A. The bolster C is also preferably strengthened by a metal strap, G, fastened along its under side; and because of these straps E F G the several parts can be made lighter without loss of necessary strength.

The bolster C is held to the front axle, D, by a metal holder or loop, H, that is passed around the center of said axle D, and has its ends turned up and fastened to the front and rear of the bolster C, and by the king-bolt I, that passes down through bolster C, axle D, and holder H, and is held in position by a nut, $e$, on its end. The sides of this loop or holder H are spread apart to permit free movement of the axle D in turning the vehicle. This loop or holder H performs all the functions or serves all the purposes of the ordinary fifth-wheel of a vehicle.

L L represent braces, fastened at one end to the rear axle, B, by clips and bolts $d$, and at the other end to the side bars, A A, by bolts $f$, thus forming "rub-irons" for the rear wheels to cut against in turning the vehicle.

M M represent the curved swinging cross-springs, terminating in eyes $g$, in which are engaged the open square clip-buckles N N, by means of which the said springs M M are suspended beneath the side bars, A A, said buckles N N being held to the side bars, A A, by the clips and clip-bars O P, the latter of which are provided with transverse grooves $h$, in which the buckles N N rest, and whereby they have a free lateral swing, which imparts to the springs M M great elasticity and freedom of motion, and an easy swing to a carriage-body supported thereon.

The clips O are preferably secured over the ends of the metal straps F F, whereby said straps are more securely held in place, and wear of said clips O on the side bars, A, is prevented.

Q Q represent the bed-pieces for the bed or body of the vehicle to rest upon.

Having thus described our invention, we claim as new and desire to secure by Letters Patent—

In vehicle-gears, the upwardly-arched side bars, A, attached at the ends to rear axle and front bolster in mortises thereof, said ends being secured by straps E E, that fasten underneath, and top straps, F F, extending over the bolster and axle, as shown and described.

A. S. F. McBRIDE.
HENRY D. HAISTEN.

Witnesses:
C. L. TUMLIN,
JAMES P. MCBRIDE,
THOS. J. PRATT.